United States Patent [19]

Ott

[11] Patent Number: 5,068,810

[45] Date of Patent: Nov. 26, 1991

[54] PROCESS FOR THE DETERMINATION OF COLORIMETRIC DIFFERENCES BETWEEN TWO SCREEN PATTERN FIELDS PRINTED BY A PRINTING MACHINE AND PROCESS FOR THE COLOR CONTROL OR INK REGULATION OF THE PRINT OF A PRINTING MACHINE

[75] Inventor: Hans Ott, Regensdorf, Switzerland

[73] Assignee: Gretag Aktiengesellschaft, Regensdorf, Switzerland

[21] Appl. No.: 550,092

[22] Filed: Jul. 9, 1990

[30] Foreign Application Priority Data

Jul. 14, 1989 [CH] Switzerland ........................ 2646/89

[51] Int. Cl.[5] ........................................ G01N 21/25

[52] U.S. Cl. .................................. 364/526; 101/211; 101/365

[58] Field of Search ...................... 364/526, 578, 525; 356/407, 402; 101/211, 365

[56] References Cited

U.S. PATENT DOCUMENTS

| | | | |
|---|---|---|---|
| 3,916,168 | 10/1975 | McCarty et al. | 364/578 X |
| 4,706,206 | 11/1987 | Benoit et al. | 364/526 |
| 4,852,485 | 8/1989 | Brunner | 101/211 |
| 4,901,254 | 2/1990 | Dolezalek et al. | 364/526 |
| 4,975,862 | 12/1990 | Keller et al. | 364/526 |
| 5,023,812 | 6/1991 | Pfeiffer | 364/519 |

FOREIGN PATENT DOCUMENTS 2107047 4/1983 United Kingdom .

OTHER PUBLICATIONS

Graphic Arts of Japan, vol. 26, 1984–85, "Estimation of Values of Primary Inks in Color Prints", (7 pages).

"Specification and Control of Process Color Images by Direct Colorimetric Measurement"; Mason, Robert P., TGA Proceedings, 1985; pp. 526 to 545.

"Spectrodensitometry: A New Approach to Color Image Analysis"; McCamy, C. S.; Tokyo Symposium 1977 on Photo. & Electro Imaging; Sep. 26–30, 1977; Society of Photographics Scientists and Engr. 1978, pp. 163–167.

*Primary Examiner*—Parshotam S. Lall

*Assistant Examiner*—S. A. Melnick

*Attorney, Agent, or Firm*—Burns, Doane, Swecker & Mathis

[57] ABSTRACT

In a process for the evaluation of the quality of prints and for the color control or ink regulation of a printing machine, half tone fields, preferably gray balance fields, are scanned by a densitometer. The half tone density differences obtained by comparative measurements are transformed by an experimentally determined transform matrix into colorimetric measure differences of a color space uniformly graduated relative to perception, so that on the one hand the advantages resulting from quality evaluations in a true colorimetric system instead of a densitometric measure system may be utilized, and on the other, the use of regulation strategies requiring a colorimetric measuring system, such as for example the L*a*b* system or the LUV system, becomes possible. The transform matrix system is determined experimentally by producing a reference calibrating print and several addition calibrating prints, each containing one gray balance field and three full tone fields. In the case of each addition calibrating print the layer thickness of another full tone field is increased. By detecting the colorimetric measure differences and the half tone density differences and substituting them into a system of equations expressing the relationship between the half tone density differences and the colorimetric measure differences, the elements of the transform matrix describing the relationship between the half tone density variations and the associated colorimetric variations, may be determined.

7 Claims, 4 Drawing Sheets

PROCESS FOR THE DETERMINATION OF COLORIMETRIC DIFFERENCES BETWEEN TWO SCREEN PATTERN FIELDS PRINTED BY A PRINTING MACHINE AND PROCESS FOR THE COLOR CONTROL OR INK REGULATION OF THE PRINT OF A PRINTING MACHINE

BACKGROUND OF THE INVENTION

The invention concerns a process for the determination of colorimetric differences between two screen pattern (half tone) fields, in particular two gray balance fields, printed by a printing machine, by the optical scanning of the screen fields and the evaluation of the reflected light.

The invention further relates to a process for the color control or ink regulation of the print of a printing machine, wherein measuring fields are optically detected on production sheets printed by the printing machine, in order to determine the color difference of the measuring field detected from a predetermined set color location and to produce a correction value from the color difference for the adjustment of the ink control elements of the printing machine, so that undesirable color deviations on the production sheets subsequently printed with the new ink control setting will become minimal.

Processes of this type are known from EP-A 228 347, DE-A1 36 26 423.7 and EP-A2 196 431.

Processes of the aforementioned type for the determination of colorimetric differences are used for quality evaluation and require the employment of colorimetric instruments or spectrophotometers in order to determine the coordinates associated with a half tone field, in particular a gray balance field, in a color space. The use of such instruments is expensive and complex in view of the extensive optical and electronic effort required. It is further known to carry out quality evaluations via measured densitometric values. While quality evaluations via a densitometric measuring system or densitometric parameters have the advantage that less expensive instruments, i.e., densitometers instead of spectrophotometers, may be used, densitometric values are not especially practical and are not equivalent to values obtained in true colorimetric systems. In the state of the art, use of densitometers restricts one to a densitometric measuring system that for quality evaluations is poorer than colorimetric numbers in a color space equidistant in perception, such as the L*a*b* color space or the LUV color space.

From EP-A 321 402 a process is known for the color control and ink regulation of a printing machine, in which via a spectrophotometer, measuring fields are scanned in order to obtain color coordinates in a colorimetric measuring system and to produce, by a coordinate comparison from the color difference of the measuring field being scanned relative to a predetermined set color position, a correction value for the adjustment of the ink control elements of the printing machine. This is effected in a manner such that a given set color position located outside a correction color space is replaced by an attainable set color position on the surface of a correction color space with a color difference from the given set color position, such that the components essential for print quality are minimized. The realization of such a control strategy requires an operation in a colorimetric coordinate system, for example the L*a*b* color space. The invention of EP-A 321 402, requires the use of a spectrophotometer in place of a densitometer.

SUMMARY OF THE INVENTION

It is an object of the invention to create a process for the determination of colorimetric differences and a process for the color control or ink regulation of the print of a printing machine in a colorimetric system, wherein the printed products to be monitored are scanned with a densitometer instead of a spectrophotometer.

This object is obtained via a process for the determination of colorimetric measure differences between two half tone fields, in particular gray balance fields, printed by a printing machine, by the optical scanning of the half tone fields and evaluation of the reflected light. The two half tone fields to be compared are scanned by a densitometer, such that for each printing ink, the differences of the associated half tone densities are determined, a half tone density difference vector formed from the half tone density differences as the components is transformed by multiplication with an inverted colorimetric half tone density transform matrix into a color variation vector containing the colorimetric measure differences as its components in a color space uniformly stepped relative to perception, wherein the colorimetric half tone density transform matrix is determined by that a reference calibration print and several addition calibration prints are printed under nominal conditions, each of said prints containing a plurality of full tone fields and a co-printed half tone field, in particular a gray balance field, similar in color to the half tone fields to be compared, wherein each addition calibrating print has for at least one full tone field a full tone density differing from the corresponding full tone field of the same color of the reference calibration print, that by means of the densitometer the half tone density differences between the half tone densities of the half tone field of the reference calibration print on the one hand and those of the half tone fields of the addition calibrating prints, on the other, and with a spectrophotometer the colorimetric measure differences between the colorimetric measures of the half tone field of the reference calibration print on the one hand, and those of the half tone fields of the addition calibrating prints, on the other, are measured, that by substituting the values of the half tone density differences and colorimetric measure differences determined in this manner into the equations $$[\Delta R]_i = [W] \cdot [\Delta F]_i$$

the elements of the colorimetric measure-half tone density transform matrix [w] are determined in which $[\Delta R]_i$ is the half tone difference vector correlated with the i addition calibrating print with the component formed by the half tone density differences for each of the printing inks, and $[\Delta F]_i$ the colorimetric measure difference vector with the component formed by the colorimetric measure differences.

The object is further obtained by means of a process for the color control of ink regulation of the print of a printing machine, wherein measuring fields on the production sheets printed by the printing machine are optically detected in order to determine the color deviation of the measuring field detected from a given set color position and from this to produce an adjusting value for the setting of the ink control elements of the printing machine, so that undesirable color variations in the new production sheets subsequently printed would become minimal, characterized in that on the production sheets a measuring field in the form of a half tone field, in particular a gray balance field, composed of several printing inks, is provided, with an OK sheet with said gray balance field and that the determination of the color deviations that may be described by colorimetric measure differences, is carried out by comparing the half tone densities obtained by scanning the two half tone fields with a densitometer, in a manner such that for each of the printing inks involved the difference of the associated half tone densities is determined, that the half tone density difference vector composed of the half tone density differences of said printing inks as the components is transformed into a color variation vector containing the colorimetric measure differences as components, by multiplication by an inverted colorimetric measure-half tone density transform matrix, in a color space uniformly stepped relative to perception, wherein the colorimetric measure-half tone density transform matrix is determined by that by the printing machine under nominal conditions a reference calibration print and several addition calibrating prints are printed, said prints comprising a plurality of full tone fields and a co-printed half tone field, in particular a gray balance field, similar in color to the half tone fields to be compared, with each of said addition calibrating prints for at least one full tone field having a full tone density differing from that of the corresponding full tone field of the same color of the reference calibration print, that by means of the densitometer the half tone density differences between the half tone densities of the half tone field of the reference calibration print on the one hand, and those of the half tone fields of the addition calibrating prints, on the other, and by means of a spectrophotometer the colorimetric measure differences between the colorimetric measures of the half tone field of the reference calibration print on the one hand, and those of the half tone fields of the addition calibrating fields, on the other, are measured, that by substituting the values obtained in this manner for the half tone density differences and colorimetric measure differences in the equations:

$$[\Delta R]_i = [W] \cdot [\Delta F]_i$$

the elements of the colorimetric measure-half tone density transform matrix [W] are determined, in which $[\Delta R]_i$ is the half tone difference vector correlated with the i addition calibrating print, with the component formed by the half tone density differences for each of the printing inks, and $[\Delta F]_i$ the colorimetric measure difference vector with the component formed by the colorimetric measure differences and that from the color variation vector obtained in this manner a layer thickness variation control vector is produced for the adjustment of the ink control elements of the printing machine.

The invention is based on a discovery that within small areas around a given color location in a colorimetric coordinate system certain transformation matrices exist, which make it possible to convert variations of colorimetric measures into half tone densities, or into variations of full tone densities of full tone fields printed simultaneously. A third relationship consists of a transformation of full tone density variations of full tone fields and half tone density variations of simultaneously printed half tone fields. When two of the aforementioned transforms are known, the third is readily calculated.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

To realize the process according to the invention for the evaluation and control of the quality of a color area built up of several partial colors, it is initially necessary to prepare calibrating colors which make it possible to empirically determine the relationships between densitometric values and colorimetric values for a selected support or working point, as a function of the paper used, the printing ink and the densitometric instrument or the type of densitometer.

Figure 1:
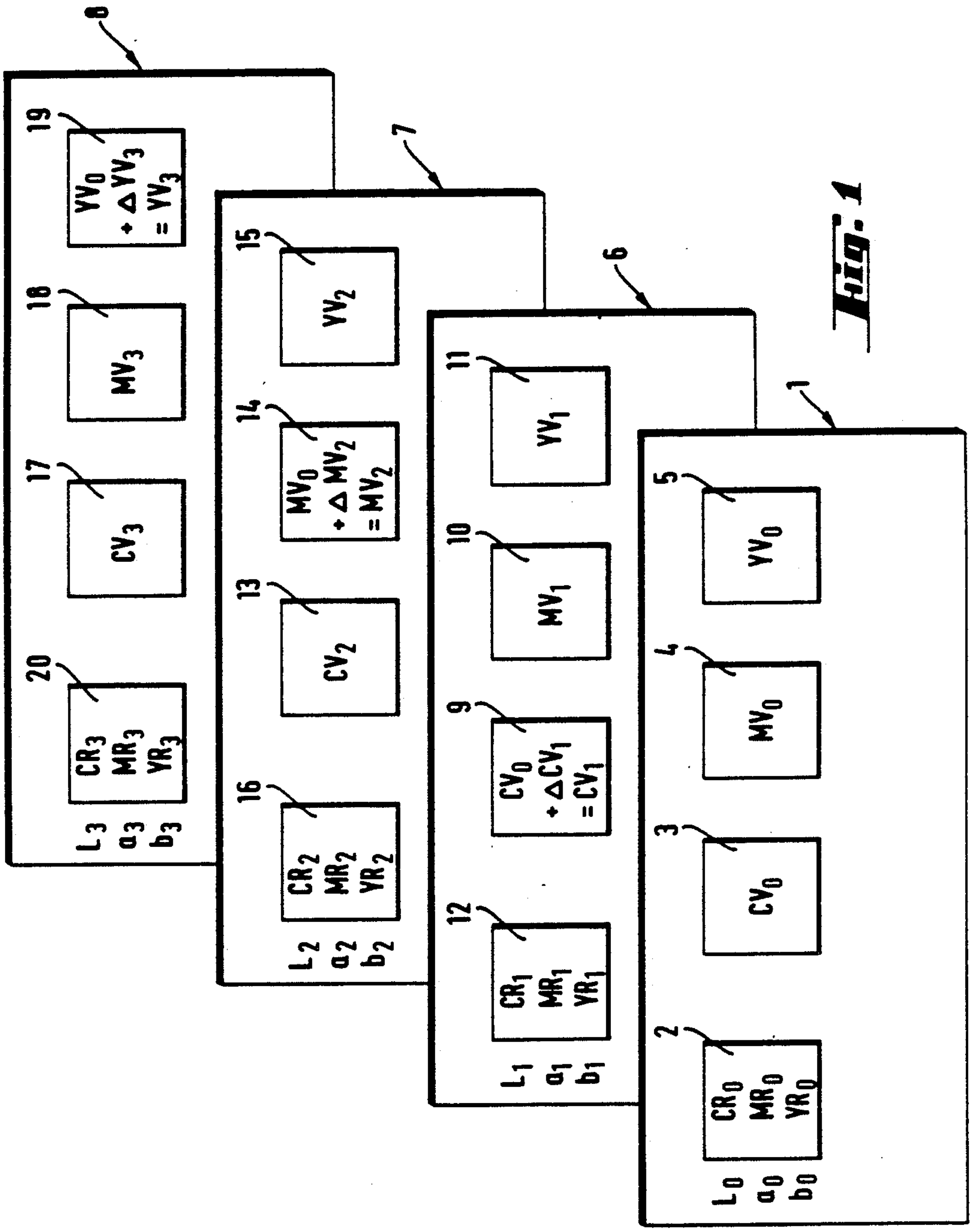
FIG. 1 shows four calibrating prints with calibrating color areas in a schematic perspective view.

FIG. 1 schematically shows four calibrating prints or calibrating cards with calibrating color areas. The calibrating table or card shown at the bottom of FIG. 1 is produced under nominal printing conditions and is referred to hereafter as reference calibration print 1. The reference calibration print 1 comprises a color measuring strip or calibration color area with four fields, the first of which is a half tone field 2, the second a cyan full tone field 3, the third a magenta full tone field 4 and the fourth a yellow full tone field 5.

The half tone field 2 consists of three half tone screens printed over each other with the colors and layer thickness of the full tone fields 3 to 5. As the half tone field 2, it is especially convenient to use a gray balance field having a tone value or gray scale (relative to layer thickness variations and colorimetrically) which is similar to a half tone field as it is encountered in the colorimetric strip of the printed product to be produced later. It is particularly desirable that the half tone field 2 of the reference calibration print 1 consist of a dark gray balance field.

Via a densitometer, and preferably with the same densitometer to be used subsequently in the quality evaluation or variation of the color appearance by layer thickness regulation of the printing machine, the half tone field 2 and the full tone fields 3, 4 and 5 of the reference calibration print 1 are measured densitometrically. This yields for the cyan full tone field 3 the cyan full tone density $CV_0$, for the magenta full tone fields 4 the magenta full tone density $MV_0$, and for the yellow full tone field 5 of the reference calibration print 1 the yellow full tone density $YV_0$.

Measurement of the preferably, but not necessarily, dark gray half tone field 2 by the densitometer yields for the half tone field 2 the cyan half tone density $CR_0$, the magenta half tone density $MR_0$ and the yellow half tone density $YR_0$. The three reference calibration values for the half tone densities are stored for a comparison with other calibrating prints in a memory, in particular in a memory of the densitometer or the memory of an associated computer, or as a printout on a sheet of paper.

In addition to being measured densitometrically, the half tone field 2 of the reference calibration print 1 is also measured colorimetrically by a spectrophotometer. The colorimetric values determined by the spectrophotometer correspond to colorimetric measures in a color space, preferably the L*a*b* color space (CIE 1976). This color space is a color system equidistantly graduated relative to perception, the colorimetric measures of which are especially suitable for quality evaluations in the color space, as they lead to higher flexibilities and information statements than do full tone or half tone densities. Another color space system that may be used is the LUV system.

Via the spectrophotometer, which later will not be needed in production printing, the colorimetric values or colorimetric measures $L_0$, $a_0$ and $b_0$ are determined for a comparison with the values of other calibrating prints. This storage is effected electronically in the spectrophotometer itself or in an associated computer. It is also possible to store the colorimetric measures as a print-out, in particular a print-out on the reference calibrating print 1 itself.

The densitometric and colorimetric measures for the reference calibrating print 1 may for example have the following values: $CV_0=1.58$, $MV_0=1.45$, $YV_0=1.48$, $CR_0=0.80$, $MR_0=0.95$, $YR_0=1.12$, $L_0=34.21$, $a_0=3.58$ and $b_0=6.06$.

The calibrating prints additionally required and shown in FIG. 1, which are constructed in a manner similar to that of the reference calibrating print 1, consist of a first addition calibrating print 6, a second addition calibrating print 7 and a third addition calibrating print 8. The fields of each of the addition calibrating prints 6 to 8 are printed, as are the fields 2 to 5 of the reference calibrating print 1, in a manner such that the layer thicknesses of the differently colored full tone fields are coordinated with the layer thicknesses of simultaneously printed individual half tone dots of the three overprinted, differently colored half tones of the corresponding half tone field.

The first addition calibrating print 6 differs from the reference calibrating print 1 in that during printing of the cyan full tone field 9 and thus, the co-printing of the associated cyan half tone field, in the half tone field 12 a higher layer thickness of the ink control elements of the printing machine was set, so that for the cyan full tone field 9 a higher cyan full tone density $CV_1$ is obtained relative to the cyan full tone field 3. The higher cyan full tone density $CV_1$ corresponding to the increased layer thickness may be expressed as the sum of the cyan full tone density $CV_0$ and the variation $\Delta CV_1$ ($CV_1=CV_0+\Delta CV_1$).

The magenta full tone field 10 of the first addition calibration print 6 has a magenta full tone density $MV_1$, which within the print tolerances corresponds to the full tone density $MV_0$ of the reference calibrating print 1. The same is true for the full tone density $YV_1$ of the yellow full tone field 11.

The co-printed half tone field 12 of the first addition calibration print 6 differs as the result of the higher layer thickness for the cyan ink from the half tone field 2 in that the half tone dots of the cyan half tone always have a higher layer thickness. For this reason, a higher measure is obtained for the half tone density $CR_1$ of the half tone field 12 in densitometer measurements, than in measuring the half tone field 2. The magenta half tone density $MR_1$ of the half tone field 12 of the first addition calibration print 6 essentially corresponds to the magenta half tone density $MR_0$ of the reference calibration print 1, as does the yellow half tone density $YR_1$ of the first addition calibration print 6.

The three measures for the full tone densities of the full tone fields 9, 10 and 11 and the measures of the half tone densities 12 of the first addition calibration print 6 are stored and used to determine the deviations of those six density values relative to the corresponding six density values of the reference calibrating print 1. These six measured deviations or variations are values for:

$\Delta CV_1=CV_1-CV_0$ $\Delta MV_1=MV_1-MV_0$ $\Delta YV_1=YV_1-YV_0$ $\Delta CR_1=CR_1-CR_0$ $\Delta MR_1=MR_1-MR_0$ $\Delta YR_1=YR_1-YR_0$ The densitometric measuring of the full tone fields 9 to 11 and the half tone field 12 of the first addition calibration print 6 is followed by the measurement of the half tone field 12 using the abovementioned spectrophotometer, in order to determine the color deviation of the half tone field 12 relative to the half tone field 2. If the three color measures of the half tone field 12 are designated $L_1$, $a_1$ and $b_1$, the following three additional values are obtained for the variation of the colorimetric values between the reference calibration print 1 and the first addition calibration print 6:

$\Delta L_1=L_1-L_0$ $\Delta a_1=a_1-a_0$ $\Delta b_1=b_1-b_0$

By the colorimetric and densitometric measurements and comparison of the reference calibration print 1 and the first addition calibrating print 6, nine deviations or nine difference values are obtained, which consist of three full tone density differences, three half tone density differences and three colorimetric measure differences. The full tone density differences $\Delta MV_1$ and $\Delta YV_1$ relative to the addition calibrating print 6 and the associated half tone density differences $\Delta MR_1$ and $\Delta YR_1$ are, in practice, other than zero. For example, the following values are obtained: $\Delta CV_1=0.19$, $\Delta MV_1=-0.01$, $\Delta YV_1=-0.02$, $\Delta CR_1=0.09$, $\Delta MR_1=0.04$, $\Delta YR_1=0.01$, $\Delta L_1=1.85$, $\Delta a_1=-2.87$ and $\Delta b_1=-2.44$.

These examples depend not only on the type of the densitometer instrument used, but also on the printing inks, the printing machine and the paper employed.

In order to empirically determine a general expression for a working point in the color space that would reproduce a relationship between the variation of the full tone densities and the variation of the half tone densities, it is necessary to prepare and measure two further addition calibration prints.

FIG. 1 shows a second addition calibrating print 7 together with the associated full tone fields 13, 14 and 15 and the co-printed half tone field 16. In the printing of the second addition calibration print 7 the same environmental conditions should be present, in particular the same paper, printing ink and printing machine used in the printing of the reference calibrating print 1 and the first addition calibrating print 6 should be used. However, in contrast to the first calibrating print 1, the second addition print 7 has significantly higher layer thickness for magenta and thus a full tone density higher by $\Delta MV_2$ of the full tone field 14 than the full tone density $MV_0$ of the full tone field 4 of the reference calibration print 1. The variation of the full tone density $\Delta MV_2$ may amount for example to 0.026. However, in the printing of the second addition calibrating print 7, variations of the full tone densities $CV_2$ and $YV_2$ of the full tone fields 13 and 15 from the full tone densities $CV_0$ and $YV_0$ of the reference calibrating print 1 are avoided. While the full tone fields 13, 14 and 15 are again measured densitometrically only, the half tone field 16 of the second addition print 7 is again measured both densitometrically and colorimetrically. In the process, deviations are encountered relative to the values determined densitometrically and colorimetrically of the reference print 1; these are determined and stored in the aforementioned manner. These values are as follows:

$\Delta L_2 = L_2 - L_0$
$\Delta a_2 = a_2 - a_0$
$\Delta b_2 = b_2 - b_0$
$\Delta CV_2 = CV_2 - CV_0$
$\Delta MV_2 = MV_2 - MV_0$
$\Delta YV_2 = YV_2 - YV_0$
$\Delta CR_2 = CR_2 - CR_0$
$\Delta MR_2 = MR_2 - MR_0$
$\Delta YR_2 = YR_2 - YR_0$ In a manner similar to that used for addition calibrating prints 6 and 7, a third addition calibrating print 8 is prepared, wherein the layer thickness for the yellow ink is considerably increased in the full tone field 19 shown in FIG. 1, top right. The resulting increase in the full tone density $\Delta YV_3$ may amount for example to 0.16. By the densitometric scanning of the full tone fields 17 to 19 and the densitometric and colorimetric scanning of the co-printed half tone field 20 of the third addition print 8, nine further measures are obtained as in the case of the first and second addition calibrating prints 6 and 7, i.e.

$\Delta L_3 = L_3 - L_0$
$\Delta a_3 = a_3 - a_0$
$\Delta b_3 = b_3 - b_0$
$\Delta CV_3 = CV_3 - CV_0$
$\Delta MV_3 = MV_3 - MV_0$
$\Delta YV_3 = YV_3 - YV_0$
$\Delta CR_3 = CR_3 - CR_0$
$\Delta MR_3 = MR_3 - MR_0$
$\Delta YR_3 = YR_3 - YR_0$ It is thus seen that the addition calibrating prints 6, 7 and 8 differ from the reference print 1 in that in each, one full tone density is being varied strongly by variations of one layer thickness, while the two other inks remain largely unaffected in their layer thickness. There are corresponding changes in the co-printed half tone fields, which are measured in contrast to the full tone fields not only densitometrically but also colorimetrically in the calibrating process.

Figure 2:
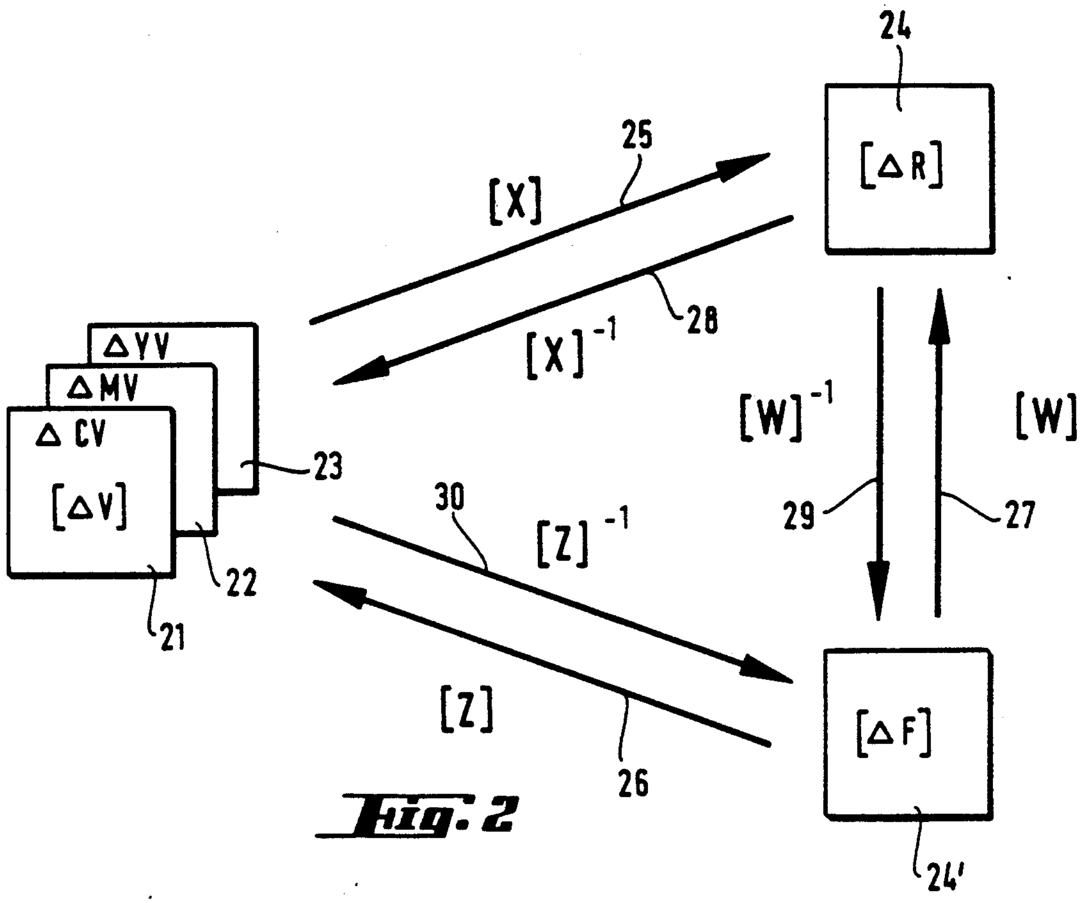
FIG. 2 is a diagram to visualize transforms between a color space, a full tone density space and a half tone density space.

FIG. 2 illustrates the concept upon which the process of the invention is based. In FIG. 2, left, three full tone fields 21, 22, 23 of a colorimetric strip of calibrating print are seen, with the variations measured by a certain densitometer of the associated full tone densities $\Delta CV$, $\Delta MV$ and $\Delta YV$, which may be interpreted as the components of a three-dimensional full tone density variation vector $[\Delta V]$. A half tone field is shown twice in FIG. 2, right, as elements 24, 24', and may in particular be a gray balance field for the surveillance of the color equilibrium of cyan, magenta and yellow printed over each other. The variations $\Delta CV_0$, $\Delta MV$ and $\Delta YV$ lead to changes in the half tone field 24, 24', wherein the densitometrically measurable variations of the half tone densities for the half tone field 24 amount to $\Delta CR$, $\Delta MR$ and $\Delta YR$. If the half tone field is measured colorimetrically with a spectrophotometer as half tone field 24', the variations resulting from the variations of the full tone densities in the full tone fields 21 to 23 of the colorimetric values $\Delta L$, $\Delta a$ and $\Delta b$ in the L*a*b* color space, are determined.

In FIG. 2, an arrow 25 shows a correlation between the full tone fields 21, 22, 23 and the half tone field 24. The correlation of the full tone density variations associated with the full tone fields 21 to 23 in a full tone density space, with the correlated half tone density variations of the half tone field 24 in a half tone density space, signifies a transformation of a three-dimensional vector that may be represented by a full tone density-half density transform matrix. This transform matrix, hereafter designated [X], comprises nine matrix elements and correlates the three full tone density variations $\Delta CV$, $\Delta MV$ and $\Delta YV$ with the three half tone density variations $\Delta CR$, $\Delta MR$ and $\Delta YR$. The transform matrix [X] thus transforms the full tone density variation vector $[\Delta V]$ formed by the three full tone density variations $\Delta CV$, $\Delta MV$ and $\Delta YV$ into a half tone density variation vector $[\Delta R]$ with the components $\Delta CR$, $\Delta MR$ and $\Delta YR$. This may be represented in a matrix mode by:

$$\begin{bmatrix} \Delta CR \\ \Delta MR \\ \Delta YR \end{bmatrix} = [X] \cdot \begin{bmatrix} \Delta CV \\ \Delta MV \\ \Delta YV \end{bmatrix}$$

or abbreviated:

$$[\Delta R] = [X] \cdot [\Delta V]$$

The transform matrix [X] for the three-dimensional vectors contains nine elements $X_{11}$ to $X_{33}$, which correspond to the partial derivatives of the components of the half tone density vector in keeping with the components of the full tone vector. Thus for the transform matrix [X]:

$$[X] = \begin{bmatrix} \frac{\delta CR}{\delta CV} & \frac{\delta CR}{\delta MV} & \frac{\delta CR}{\delta YV} \\ \frac{\delta MR}{\delta CV} & \frac{\delta MR}{\delta MV} & \frac{\delta MR}{\delta YV} \\ \frac{\delta YR}{\delta CV} & \frac{\delta YR}{\delta MV} & \frac{\delta YR}{\delta YV} \end{bmatrix} = \begin{bmatrix} X_{11} & X_{12} & X_{13} \\ X_{21} & X_{22} & X_{23} \\ X_{31} & X_{32} & X_{33} \end{bmatrix}$$

In FIG. 2, an arrow 26 between the half tone field 24' and the full tone fields 21 to 23 represents a correlation between variations of the color position associated with the color of the half tone 24' in the L*a*b* color space and the associated variation of the colorimetric values of colorimetric measures on the one hand, and the full tone density variations of the co-printed full tone fields 21 to 23, on the other. This corresponds to a transformation of a three-dimensional color variation vector [ΔF], the components of which are formed by the colorimetric measure variations ΔL, Δa and Δb, in the L*a*b* color space, into the coordinated three-dimensional full tone density variation vector ΔV in the full tone density space. The colorimetric full tone density transformation matrix correlated with the transformation indicated by the arrow 26 is designated [Z] in FIG. 2 and is written in an abbreviated form as:

$$[\Delta V]=[Z]\cdot[\Delta F]$$

The nine components of the matrix [Z] are formed in a manner similar to the matrix [X] by the partial derivatives of the components of the full tone vector from the components of the color vector.

Finally, in FIG. 2 an arrow 27 is seen between the half tone field 24' and the half tone field 24. The arrow 27 represents a correlation between the variations ΔL, Δa, Δb in the L*a*b* color space of the half tone field 24' and the associated densitometrically determinable half tone density variations ΔCR, ΔMR and ΔYR of the half tone field 24, which bodily is identical with the half tone field 24'. The correlation represented by the arrow 27 between three variations of colorimetric measures and three variations of half tone densities may be described by a colorimetric measure-half tone density-transformation matrix. The matrix, abbreviated as the transformation matrix [W], makes possible the transformation of the three-dimensional color variation vector [ΔF] in the L*a*b* color space, into a half tone density variation vector [ΔR] in the half tone density space. The transformation matrix [W] has nine elements, as it transforms a three-dimensional vector into another three-dimensional vector. The elements $W_{11}$ to $W_{33}$ are formed by the partial derivatives of the components of the vector [ΔR] from the components of the vector [ΔF]. Therefore the following is valid for the transformation matrix [W]=

$$[W]=\begin{bmatrix}\frac{\delta CR}{\delta L} & \frac{\delta CR}{\delta a} & \frac{\delta CR}{\delta b}\\ \frac{\delta MR}{\delta L} & \frac{\delta MR}{\delta a} & \frac{\delta MR}{\delta b}\\ \frac{\delta YR}{\delta L} & \frac{\delta YR}{\delta a} & \frac{\delta YR}{\delta b}\end{bmatrix}=\begin{bmatrix}W_{11} & W_{12} & W_{13}\\ W_{21} & W_{22} & W_{23}\\ W_{31} & W_{32} & W_{33}\end{bmatrix}$$

The transformation between the colorimetric measure variations and the variations of the half tone densities may thus be represented as follows:

$$\begin{bmatrix}\Delta CR\\ \Delta MR\\ \Delta YR\end{bmatrix}=[W]\cdot\begin{bmatrix}\Delta L\\ \Delta a\\ \Delta b\end{bmatrix}$$

or briefly:

$$[\Delta R]=[W]\cdot[\Delta F]$$

It follows from FIG. 2 and the above explanation that the transformation matrices [X], [W] and [Z] may be correlated with inverse transformation matrices $[X^{-1}]$, $[W^{-1}]$ and $[Z^{-1}]$, indicated in FIG. 2 by the arrows 28, 29 and 30 and which may be used in the case of a transformation in the inverse direction for the transformations visualized by the arrows 25, 27 and 26. It is seen in FIG. 2 and from the above explanation that when two transformation matrices that are inverse relative to each other are known, arbitrary conversions between variations in the full tone density space, half tone density space and the L*a*b* color space can be calculated. The transformation matrices [X], [W] and [Z] are valid in the process only for the working point for which they are determined because in the considerations presented in the foregoing, linear relationships, which are not always correct, are assumed if the variations under consideration are taking place in a relatively small volume of the entire three-dimensional color space. The working point is defined as the point in space around which the variations occur.

If in addition to the aforementioned transformation matrices the readily calculated inverse transformation matrices are also considered, then the following further relationships written in an abbreviated form are valid; they may also be seen in FIG. 2:

$$[\Delta V]=[X]^{-1}\cdot[\Delta R]$$
$$[\Delta F]=[W]^{-1}\cdot[\Delta R]$$
$$[\Delta F]=[Z]^{-1}\cdot[\Delta V]$$
$$[\Delta V]=[X]^{-1}\cdot[W]\cdot[\Delta F]$$
and
$$[\Delta F]=[W]^{-1}\cdot[X]\cdot[\Delta V]$$

When nine elements of two transformation matrices are known it is possible to carry out any calculation involving the full tone densities of the full tone fields, the half tone densities of the half tone fields and the colorimetric measures of the half tone fields of printed calibrating color areas or color measuring strips. The calibrating color areas initially serve to determine the matrix elements which later are available for the surveillance of a color measuring strip for conversions.

Figure 3:
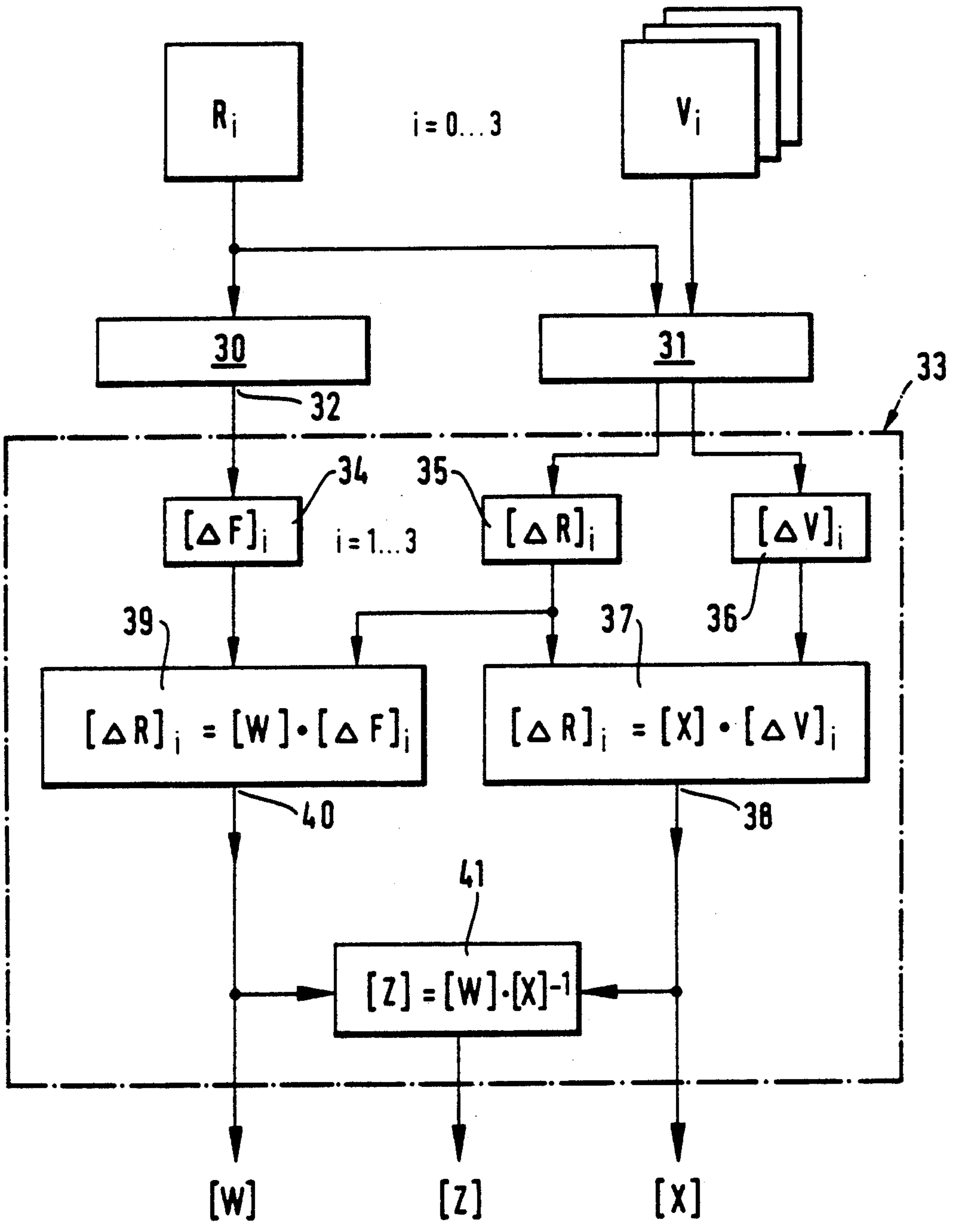
FIG. 3 is a schematic representation of the process for the determination of transform matrices between the coordinate spaces shown in FIG. 2; and, FIG. 4 is a schematic representation of the mode of operation of the process for the evaluation of quality by the determination of colorimetric differences and for the color control or ink regulation of the print of a printing machine.

FIG. 3 illustrates how, according to the process of the invention, by measuring the calibrating prints described in relation to FIG. 1, the transformation matrices [X], [W] and [Z] are determined for a working point predetermined for example by a gray balance field. In FIG. 3, in top, left, a half tone field $R_i$ with i=0, 1, 2 or 3 is seen, wherein depending on the index i, the half tone field 2, 12, 16 or 20 of FIG. 1 is involved.

In FIG. 3, top right, a trio of full tone fields $V_i$ is seen, with the index i varying from 0 to 3. If the index i=0, the trio of the full tone fields $V_0$ consists of the full tone fields 3, 4 and 5 according to FIG. 1. The full tone fields 9, 10 and 11 known from FIG. 1 correspond to the trio of full tone fields $V_1$, the full tone fields 13, 14, and 15 to the trio of full tone fields $V_2$ and the full tone fields 17, 18 and 19 to the trio of the full tone fields $V_3$.

At the onset of the calibrating measurements for the determination of the transform matrices [X], [W] and [Z], the reference calibration print 1 is measured with the half tone field $R_0$ and the trio of the full tone fields $V_0$. In FIG. 3 a spectrophotometer 30 is seen, which makes it possible to measure the half tone of the half tone fields $R_0$ to $R_3$, which, as mentioned above, correspond to the half tone fields 2, 12, 16 and 20, the half tone fields $R_0$ to $R_3$ are also measured with the densitometer 31 schematically shown in FIG. 3.

The spectrophotometer 30 yields the colorimetric measures $L_0$, $a_0$, $b_0$ for the half tone calibrating field 1; $L_1$, $a_1$, $b_1$ for the half tone field $R_1$ of the first addition calibrating print 6; $L_2$, $a_2$, $b_2$ for the half tone field $R_2$ of the second addition calibrating print 7; and $L_3$, $a_3$, $b_3$ for the half tone field $R_3$ of the third addition calibrating print 8. From the outlet 32 of the spectrophotometer the triplet of the colorimetric measures $L_i$, $a_i$ and $b_i$ pass into a computer 33 associated with the spectrophotometer 30 and the densitometer 31, either directly, or with the insertion of a display and manual keyboard.

The computer 33 comprises a difference calculator 34 for the colorimetric measures detected by the spectrophotometer 30 and calculates the differences between the colorimetric values $L_i$, $a_i$ and $b_i$ with $i=1, 2, 3$, of the half tone fields $R_1$, $R_2$ and $R_3$ on the one hand, and the colorimetric measures $L_0$, $a_0$, $b_0$ of the half tone field $R_0$, on the other. The difference calculator 34 subsequently stores the difference values calculated for the colorimetric measures, namely, the numerical values for $\Delta L_1$, $\Delta a_1$, $\Delta b_1$, $\Delta L_2$, $\Delta a_2$, $\Delta b_2$, $\Delta L_3$, $\Delta a_3$, and $\Delta b_3$. The three colorimetric value differences for the first addition calibrating print 6 may be interpreted as the components of a three-dimensional vector $[\Delta F]_1$, those for the second addition calibrating print 7 as components of a vector $[\Delta F]_2$ and those for the third addition calibrating print 8 as components of a vector $[\Delta F]_3$. In the block assigned in FIG. 3 to the difference calculator 34 for the colorimetric values, these three-dimensional vectors are shown as $[\Delta F]_i$ with $i=1, 2, 3$.

The half tone fields $R_0$, $R_1$, $R_2$, $R_3$ are additionally measured with the densitometer 31 to determine the half tone densities for each of the colors cyan, magenta and yellow, so that subsequently in a difference calculator 35, the half tone densities of the half tones $R_1$, $R_2$, $R_3$ on the one hand, and the half tone density of the half tone $R_0$ on the other, may be calculated. Specifically, following the storage of the half tone density differences, these nine values are available at the outlet of the difference calculator 35: $\Delta CR_1$, $\Delta MR_1$, $\Delta YR_1$, $\Delta CR_2$, $\Delta MR_2$, $\Delta YR_2$, $\Delta CR_3$, $\Delta MR_3$, $\Delta YR_3$. In an abbreviated manner these half tone differences may be written as half tone density variation vectors $[\Delta R]_i$ with $i=1, 2, 3$.

The densitometer 31 is also used during the calibrating measurements on the calibrating prints for the densitometric measurements of the full tone fields $V_0$ of the reference calibrating print 1, the full tone fields $V_1$ of the first addition calibrating print 6, the full tone fields $V_2$ of the second addition calibrating print 7 and the full tone fields $V_3$ of the third addition calibrating print 8. These full tone fields carry in FIG. 1 the reference symbols 3, 4, 5, 9, 10, 11, 13, 14, 15, 17, 18 and 19.

As seen in FIG. 3, the densitometer 31 is also electrically connected either directly or through a manual display and keyboard with a difference calculator 36 for full tone densities located in computer 33. The difference calculator 36 for full tone densities calculates, given the full tone densities determined by the densitometer 31 for each of the three printing colors, the difference between the full tone density of an addition calibrating print 6, 7 or 8 and the full tone density of the same color of the reference calibrating print 1. Subsequently, these values are stored for further processing in the difference calculator 36 for full tone densities. Specifically, the following nine full tone differences are calculated and stored: $\Delta CV_1$, $\Delta MV_1$, $\Delta YV_1$, $\Delta CV_2$, $\Delta MV_2$, $\Delta YV_2$, $\Delta CV_3$, $\Delta MV_3$, $\Delta YV_3$. These numerical triplets associated with each of the addition calibrating prints may be written in an abbreviated manner as a three-dimensional vector $[\Delta V]$; with $i=1, 2, 3$.

The difference calculator 35 for half tone densities and the difference calculator 36 for full tone densities feed a first matrix computer 37, as seen in the block diagram of FIG. 3. The matrix computer 37 is used to determine the nine elements of the transform matrix [X]. For this, it receives the aforementioned nine numerical values from the difference calculator 35 for the half tone density differences, and the aforementioned nine values for the full tone differences from the difference calculator 36 for the full tone densities. By setting these numerical values into the three matrix equations:

$$[\Delta R]_i = [X]\cdot[\Delta V]_i$$

with $i=1$, 2 and 3. The following nine equations are obtained for the nine unknowns of the transform matrix [X]:

$$\begin{aligned}
\Delta CR_1 &= X_{11}\cdot\Delta CV_1 + X_{12}\cdot\Delta MV_1 + X_{13}\cdot\Delta YV_1\\
\Delta CR_2 &= X_{11}\cdot\Delta CV_2 + X_{12}\cdot\Delta MV_2 + X_{13}\cdot\Delta YV_2\\
\Delta CR_3 &= X_{11}\cdot\Delta CV_3 + X_{12}\cdot\Delta MV_3 + X_{13}\cdot\Delta YV_3\\
\Delta MR_1 &= X_{21}\cdot\Delta CV_1 + X_{22}\cdot\Delta MV_1 + X_{23}\cdot\Delta YV_1\\
\Delta MR_2 &= X_{21}\cdot\Delta CV_2 + X_{22}\cdot\Delta MV_2 + X_{23}\cdot\Delta YV_2\\
\Delta MR_3 &= X_{21}\cdot\Delta CV_3 + X_{22}\cdot\Delta MV_3 + X_{23}\cdot\Delta YV_3\\
\Delta YR_1 &= X_{31}\cdot\Delta CV_1 + X_{32}\cdot\Delta MV_1 + X_{33}\cdot\Delta YV_1\\
\Delta YR_2 &= X_{31}\cdot\Delta CV_2 + X_{32}\cdot\Delta MV_2 + X_{33}\cdot\Delta YV_2\\
\Delta YR_3 &= X_{31}\cdot\Delta CV_3 + X_{32}\cdot\Delta MV_3 + X_{33}\cdot\Delta YV_3
\end{aligned}$$

After the appropriate 18 numerical difference values supplied by the difference calculators 35 and 36 are substituted into the above system of nine equations, the first matrix computer 37 determines the numerical values for the nine unknowns $X_{11}$, $X_{12}$, $X_{13}$, $X_{21}$, $X_{23}$, $X_{31}$, $X_{32}$, $X_{33}$. These numerical values are put out by the first matrix computer 37 at the outlet 38 in the form of the nine elements of the transform matrix [X].

The computer 33 contains, as further seen in FIG. 3, a second matrix computer 39 for the calculation of the transform matrix [W]. The second matrix computer 39 substitutes the difference values determined and temporarily stored by the difference calculators 34 and 35 into the matrix equation $[\Delta R]_i=[W]\cdot[\Delta F]_i$. This yields the following nine equations for the nine unknowns of the elements of the transform matrix [W]:

$$\begin{aligned}
\Delta CR_1 &= W_{11}\cdot\Delta L_1 + W_{12}\cdot\Delta a_1 + W_{13}\cdot\Delta b_1\\
\Delta CR_2 &= W_{11}\cdot\Delta L_2 + W_{12}\cdot\Delta a_2 + W_{13}\cdot\Delta b_2\\
\Delta CR_3 &= W_{11}\cdot\Delta L_3 + W_{12}\cdot\Delta a_3 + W_{13}\cdot\Delta b_3\\
\Delta MR_1 &= W_{21}\cdot\Delta L_1 + W_{22}\cdot\Delta a_1 + W_{23}\cdot\Delta b_1\\
\Delta MR_2 &= W_{21}\cdot\Delta L_2 + W_{22}\cdot\Delta a_2 + W_{23}\cdot\Delta b_2\\
\Delta MR_3 &= W_{21}\cdot\Delta L_3 + W_{22}\cdot\Delta a_3 + W_{23}\cdot\Delta b_3\\
\Delta YR_1 &= W_{31}\cdot\Delta L_1 + W_{32}\cdot\Delta a_1 + W_{33}\cdot\Delta b_1\\
\Delta YR_2 &= W_{31}\cdot\Delta L_2 + W_{32}\cdot\Delta a_2 + W_{33}\cdot\Delta b_2\\
\Delta YR_3 &= W_{31}\cdot\Delta L_3 + W_{32}\cdot\Delta a_3 + W_{33}\cdot\Delta b_3
\end{aligned}$$

After evaluating this system of equations, the second matrix computer 39 supplies at its outlet 40 the nine elements of the transform matrix [W].

The outlets 38 and 40 of the first matrix computer 37 and the second matrix computer 39 also supply the two inlets of a third matrix computer 41, which inverts the transform matrix [X] and multiplies it by the transform matrix [W], in order to calculate the nine elements of the transform matrix [Z] described in connection with FIG. 2.

As soon as the elements of the transform matrices [X], [W] and [Z] are present in the computer 33, the spectrophotometer 30 is no longer needed to carry out quality control and quality evaluations with the densitometer 31 in the L*a*b* color space.

Figure 4:
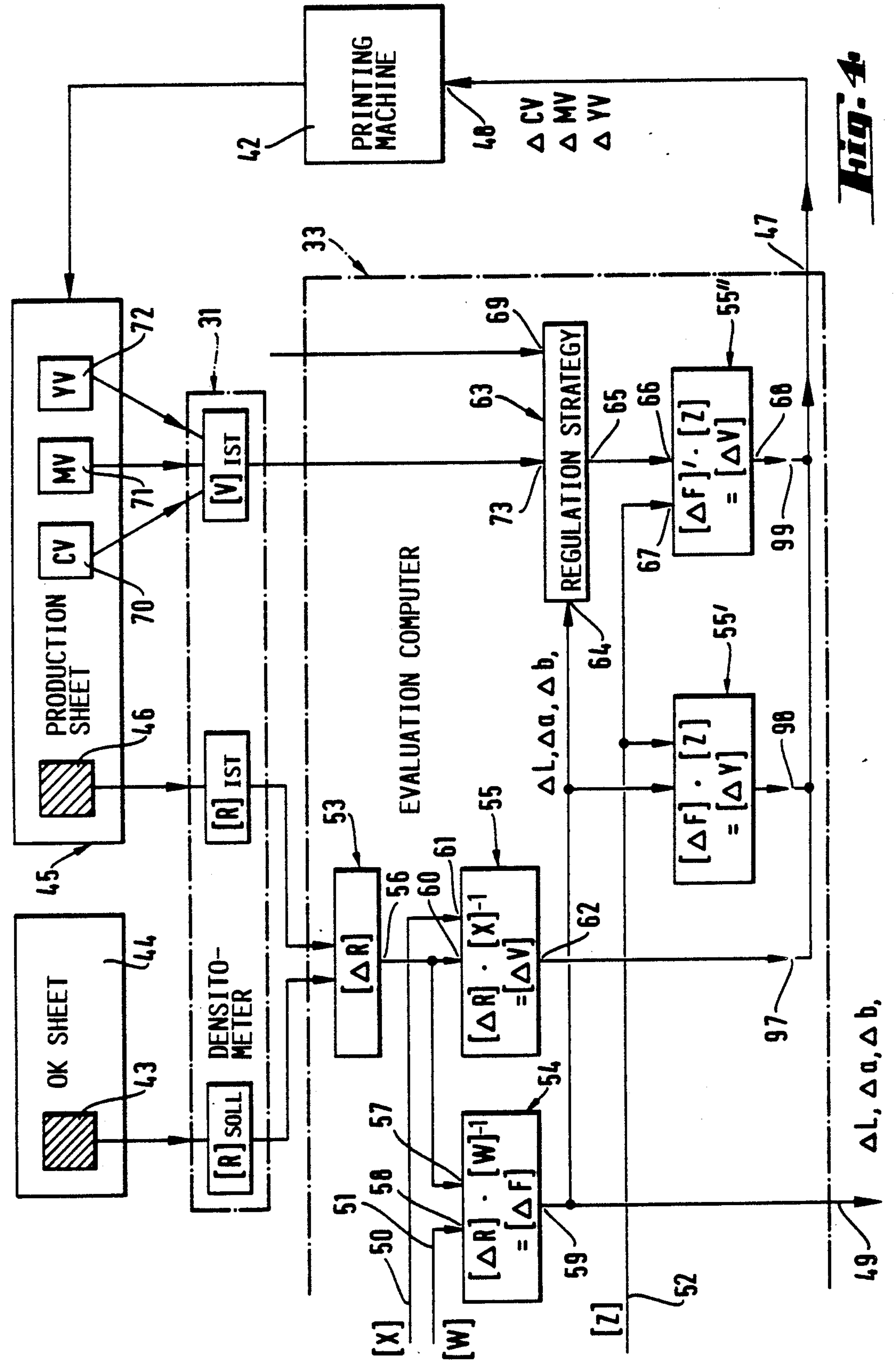

Once the system is calibrated by the above process, the densitometer 31 can be set onto a half tone field 43 similar to the half tone fields of the calibrating prints, in particular a gray balance half tone field of a sample sheet or OK sheet 44 (FIG. 4). The system consisting of the densitometer 31 and the computer 33 can then be used to determine the differences between the colorimetric measures of the half tone field 43 of the OK sheet 44 and the colorimetric measures of the half tone field 2 of the reference calibrating print 1. Once these differences or deviations are determined, it is possible to determine, with consideration of the colorimetric values known from the measurements with the spectrophotometer 30 of the half tone field 2 of the reference calibrating print 1, the absolute colorimetric measures of the half tone field 43 of the OK sheet 44 without having to scan the OK sheet 44 with a spectrophotometer. To obtain a high degree of accuracy, the same nominal conditions should be applied in the production of the reference calibration print 1 as in the preparation of the OK sheet 44, and the densitometer 31 used to scan the OK sheet 44 should be the same, or at least of the same type, as that used for the scanning of the calibration print.

FIG. 4 shows in a schematic view the system consisting of the computer 33 and the densitometer 31 together with a printing machine 42 controlled by said system and the OK sheet 44 and a production sheet 45.

The sample sheet or OK sheet 44 is drawn in FIG. 4 on top left, with a half tone field 43, which serves as the reference color area and which is similar in coloration to the half tone field 2 of the reference calibration print 1. During the printing of production sheets 45, one of which is shown in FIG. 4, together with a color measuring strip, the color appearance of the half tone 43 is compared continuously with a half tone field 46, in particular of a corresponding gray balance field in the color measuring strip of the production sheets 45.

The layout shown in FIG. 4 with the densitometer 31 and the computer 33, is used to monitor the production sheets 45 continuously printed with the printing machine 42 for their colorimetric agreement with the OK sheet 44, and to adjust the ink control elements of the printing machine 42 in case of deviations. To accomplish this, the computer 33 outputs a control value at the outlet 47 for input into the inlet 48 of the layer thickness control of the printing machine 42.

The adjusting signals entering the inlet 48 consist of a layer thickness variation control vector, the components of which are shown in FIG. 4. The component ΔCV of the layer thickness variation control vector determines the amount that the layer thickness of the cyan printing ink must be altered to correct the color appearance of the half tone field 46, if it deviates from the color appearance of the half tone field 43 on the OK sheet 44. Correspondingly, the components ΔMV and ΔYV of the layer thickness variation control vector [ΔV] are correlated with the necessary layer thickness variations for the magenta and yellow printing inks.

As seen in FIG. 4, the densitometer 31 is used initially to determine and store the set value for the half tone density vector $[R]_{soll}$, obtained by measuring the half tone field 43 of the OK sheet 44. These are the components $CR_{soll}$, $MR_{soll}$, and $YR_{soll}$ of the half tone density vector $[R]_{soll}$.

Similarly, via the densitometer 31 the actual value of the half tone density vector $[R]_{ist}$ is determined by measuring the half tone field 46 in the color measuring strip of the production sheet 45.

The computer 33 comprises several hardware or software computing units which represent an evaluating computer making it possible to produce, from the comparison of the vector $[R]_{ist}$ with the vector $[R]_{soll}$, a quality measure for the printed production sheet 45 at the outlet 49 of the computer 33, and to produce an inlet value for the layer thickness control at the outlet 47 of the computer 33.

The part of the computer 33 designated in FIG. 4 as the evaluating computer, receives not only the measures of the densitometer 31 as the input values, but also the matrix elements previously determined by the calibrating prints of the transform matrices [X], [W] and [Z]. These values arrive through the inlets 50, 51 and 52 in the part designated as the evaluating computer of the computer 33.

The computer 33 comprises, as seen in FIG. 4, a half tone density difference calculator 53, which calculates the deviations between the actual half tone densities measured on the production sheet 45 and the set half tone density determined on the OK sheet 44. The outlet 56 of the half tone density difference calculator 53 is connected with a first inlet 57 of a quality measure computer 54, the second inlet 58 of which is exposed to the values of the nine matrix elements of the transform matrix [W]. In correspondence to the relationship illustrated in FIG. 2, in the quality measure computer 54 the transform matrix [W] is inverted and subsequently multiplied by the half tone density difference vector [ΔR]. At the outlet 59 of the quality measure computer 54 the computed results are available in the form of the colorimetric measure differences ΔL, Δa and Δb; they may also be considered the components of a three-dimensional color difference vector [ΔF].

Due to the computations of the quality measure computer 54 and the transform matrix [W], colorimetric measures or their differences are available at the outlet 49, even though the computer 33 was fed not the data of a colorimetric instrument, but those of the densitometer 31. The colorimetric measure variations available at the outlet 49 of the computer 33 make possible quality evaluations in the color space, such that a significantly less complex and more meaningful quality control is obtained, relative to the quality evaluations obtained via density values. In the process, the quality measure computer 54 performs a conversion of density value deviations into deviations of the color coordinates of a color space uniformly spaced relative to perception. On the basis of these known deviations and the colorimetric measures for the calibrating print or the OK sheet, it is then possible to determine the absolute color coordinates.

The half tone density difference calculator 53 also feeds the first inlet 60 of a first layer thickness control computer 55. The first layer thickness control computer 55 receives at its second inlet 61 the values of the elements of the transform matrix [X] supplied through the inlet 50 of the computer 33. Following the inversion of the transform matrix [X] the first layer thickness control computer 55 uses the product of the inverted transform matrix $[X]^{-1}$ and the half tone density difference vector [ΔR] to compute the components ΔCV, ΔMV and ΔYV of the layer thickness variation control vector [ΔV]. These values are sent from the outlet 62 of the first layer thickness control computer 55 to the outlet 47 of the computer 33 and from there to the inlet 48 of the layer thickness control for the ink control elements of the printing machine 42.

In addition to the determination of the layer thickness variation control vector [ΔV] described above, in FIG. 4 two further possibilities are shown for the determination of the layer thickness variation control vector, wherein the interruptions 97, 98 and 99 in the lines drawn are intended to demonstrate that depending on the possibility chosen, an interruption 97, 98 and 99 is bridged over.

In the first additional possibility the first layer thickness control computer 55 may be eliminated as illustrated by the interrupt 97. Then, via the color difference vector [ΔF] at the outlet 59 of the quality measure computer 54, with the use of the transform matrix [Z] in an alternate second layer thickness control computer 55', which is connected by bridging the interrupt 98, the layer thickness variation control vector [ΔV] is computed by the equation:

$$[\Delta V] = [\Delta F]\cdot[Z]$$

It is seen that the determination of the layer thickness variation control vector [ΔV] by this process is carried out over the L*a*b* color space.

This opens up another possibility shown in FIG. 4, in which the colorimetric measure differences ΔL, Δa and Δb supplied by the outlet 59, are corrected by a regulation strategy shown in FIG. 4 as the block 63 and used to form an input value of a third layer thickness control computer 55".

The regulation strategy block 63 receives colorimetric measure differences fed into the colorimetric measure inlet 64 and produces the substitute colorimetric measure differences ΔL', Δa' and Δb', which are put out through the outlet 65 to feed the first inlet 66 of the third layer thickness control computer 55". The second inlet 67 of the third layer thickness control computer 55" receives the matrix elements of the transform elements [Z], so that the layer thickness variation control vector [ΔV] may be computed by the equation:

$$[\Delta V] = [\Delta F]'\cdot[Z]$$

in which [ΔF]' is the vector from the substitute colorimetric measure differences ΔL', Δa' and Δb'. The layer thickness variation control vector [ΔV] is fed at the outlet 68 of the third layer thickness control computer 55" and through the outlet 47 to the inlet 48 of the printing machine 42, if the interruption 99 is closed. The layer thickness variation control vector has been altered or improved according to the strategy specified in the regulation strategy block 63, to form a layer thickness variation control vector such as that available at the outlet 98 of the layer thickness control computer 55'.

Numerous regulation strategies may be used in the regulation strategy block 63 for replacing the colorimetric measure differences with improved colorimetric measure differences. In particular, a regulation strategy may be realized in the regulation strategy block 63, which makes it possible to obtain the highest possible printing quality even if the predetermined set color position is located in the color space outside a correction range limited by maximum and minimum full tone layer thicknesses.

The regulation strategy block 63 is therefore provided in the exemplary embodiment shown with a boundary value inlet 69, through which the boundary conditions, i.e., the minimum and maximum permissible layer thicknesses are entered. In order to detect the layer thickness of the three printing inks actually present, it is necessary when using the aforedescribed regulation strategy, to measure additional full tone fields 70, 71 and 72 densitometrically on the production sheet 45. The full tone field 70 is a full tone field with the full tone density CV for the cyan ink. The full tone field 71 is a full tone field with the full tone density MV for the magenta printing ink and the full tone field 72 a full tone field with a full tone density of YV for the yellow printing ink.

When using the regulation strategy block 63, in addition to the densitometric measurement of the half tone field 46, the full tone fields 70 to 72 are also measured by the densitometer 31, in order to be able to determine within the regulation strategy whether a regulation of the layer thicknesses would lead to a layer thickness range that no longer is permissible. The densitometer 31 is therefore connected with a set full tone inlet 73 of the regulation strategy block 63, if the regulation strategy 63 is used.

The regulation strategy realized in the regulation strategy block 63 is described in detail in EP-A 321 402, the disclosure of which is hereby incorporated by reference in its entirety.

The colorimetric measures of the references calibration print 1 were entered through an inlet, not shown, of the regulation strategy block 63 in FIG. 4, so that with these colorimetric measures and the colorimetric measure differences received at the colorimetric measure inlet 64, the color position of the color of the half tone field 46 is available for the regulating strategy.

The color position of the half tone field 43 of the OK sheet 44 is obtained simply by successively measuring densitometrically the reference calibration print 1 and the OK sheet 44 the layout shown in FIG. 4. Then based on the known colorimetric measures of the reference calibration print 1 and the colorimetric measure differences calculated by the evaluating computer of the computer 33 for the half tone field 43, the color position of the half tone field 43 of the OK sheet 44 is obtained. A comparison of the half tone field 43 of the OK sheet 44 with the half tone field 46 of the production sheet 45 yields the colorimetric measure differences between the half tone field 46 and the half tone field 43, so that in the final analysis for the half tone field 46, not only the colorimetric measure differences, but also the absolute colorimetric measures or color coordinates in the L*a*b*, are known.

The color coordinates determined in this manner in the color space indicate a set color position around which a correction color space may be determined by the regulation strategy block, based on the predetermined boundary layer thicknesses for the full tone fields 70 to 72 and the actual full tone densities measured by the densitometer.

If a comparison of the actual color position of the half tone field 46 with the set color location of the half tone 43 indicates that the set color position is located outside the correction space, then according to the regulation strategy implemented in the regulation strategy block 63 the predetermined set color location is replaced by an attainable set color position located on the boundary surface of the correction color space and having a color distance from the predetermined set color position with essential components relative to print quality being minimized.

In particular, in the implemented regulation strategy, the location on the surface of the correction color space having the smallest color distance from the predetermined set color position will be selected as the attainable color position. There are different possibilities for the determination of an optimum replacement color position according to the regulation strategy, depending on the position of the set color position in the L*a*b* color space outside the correction color space established around the actual color position in the L*a*b* color space. One possibility consists of drawing a perpendicular from the given set color location on the adjacent lateral surface of the correction color space and using the intersection of the perpendicular with the lateral surface as the attainable set color position.

Alternately, if such a solution is not feasible, it is possible according to the regulation strategy to drop a perpendicular from the given set color position to the adjacent lateral edge of the correction color space and use the intersection with the lateral edge as the attainable set color position.

If this solution again is not possible, the adjacent corner of the correction color space is used as the attainable color position.

Alternately, it is known that chrominance errors are more critical than purely luminance errors. Therefore, according to an alternate embodiment of the regulation strategy, a parallel to the luminance coordinate axis through the predetermined set color position is formed, and the intersection of the parallel nearest a given set color position with the surface of the correction color space is chosen as the attainable color position or substitute set color position. According to a special modification of this process, for the points located on the parallel to the luminance coordinate axis through the given set color position within a given luminance error range with a maximum and a minimum luminance, the nearest points on the surface of the correction color space are determined as the attainable color positions. It is possible in the process that the nearest point on the surface of the correction color space is determined as the point on the parallel correlated with the highest acceptable luminance error.

Alternately, the regulation strategy may also provide the intersection of the color distance vector between the actual color position of the half tone field 46 and the given set color position of the half tone field 43 with the surface of the color correction space as the attainable substitute set color position.

It is seen from the above examples of the regulation strategy that the regulation strategy is applied in the L*a*b* color space, even though the half tone field 46 of the production sheet 45 has been scanned not with a colorimetric instrument, but merely with a densitometer 31. The use of the regulation strategy block 63 and the third layer thickness control computer 55″ thus makes it possible to replace an unattainable color position given on the OK sheet 44 according to a regulation strategy with an attainable set color position, so that for an actual color position of the half tone field 46 of the production sheet 45 an optimum position may be sought in the color coordinate space, even though the color coordinates of the half tone field 46 were not determined with a colorimetric instrument or a spectrophotometer.

In the regulation strategy described in the aforecited EP-A 321 402, a measure processing device is provided, wherein the color distance vectors between the set color position and the actual color position are multiplied by a sensitivity matrix, in order to calculate the layer thickness variation control vector that must be taken into consideration in the subsequent printing of a production sheet 45 to attain the color position shift desired. The sensitivity matrix, used to calculate the density differences for the color position displacement between the set color position and the actual color position, may be determined in the aforementioned regulation strategy empirically and technically by an experimental series.

Alternately, according to an embodiment of the present invention as shown in FIG. 4, the regulation strategy block 63 at the outlet 65 need not calculate a layer thickness variation control vector, but rather merely convert the substitute colorimetric measure differences 55″ via the transform matrix [Z] into a layer thickness variation control vector.

Another particularly simple possibility for a regulation strategy, in which the boundary conditions of the full tone densities are taken into consideration, may be realized in a manner not shown in FIG. 4. The outlet of the second layer thickness control computer 55′ may supply another inlet of the regulation strategy block 63, in order to prevent the appearance at the outlet of the regulation strategy block 63 of colorimetric measure differences, which following their conversion in the third layer thickness control computer 55″ would lead to an overregulation of the ink control elements beyond the layer thickness boundary values.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the determination of colorimetric measure differences between two subject half tone fields, in particular gray balance fields, printed by means of a printing machine, by the optical scanning of the half tone fields and evaluation of the reflected light, comprising the steps of:

printing a reference calibration print and several addition calibration prints under nominal conditions, each of said prints containing a plurality of full tone fields and a coprinted half tone field similar in color to the subject half tone fields, each addition calibrating print having for at least one full tone field, a full tone density differing from said corresponding full tone field of similar color of a reference calibration print;

determining, by means of a densitometer, half tone density differences between half tone densities of the half tone field of the reference calibration print and half-tone densities of the half-tone fields of the addition calibration prints;

determining, by means of a spectrophotometer, colorimetric measure differences between colorimetric measures of the half tone field of the reference calibration print, and colorimetric measures of the half tone fields of the addition calibration prints;

substituting values of the half tone density differences and colorimetric measure differences determined into a matrix equation:

$$[\Delta R]_i = [W] \cdot [\Delta F]_i$$

to determine elements of a colorimetric measure-half tone density transform matrix [W] in which $[\Delta R]_i$ is a half tone difference vector correlated with an addition calibrating print indexed by a value i and having components formed from the half tone density differences for each printing ink, and $[\Delta F]_i$ is a colorimetric measure difference vector with components formed from the colorimetric measure differences;

inverting said colorimetric half tone density transform matrix;

scanning by means of a densitometer, the two subject half tone fields for comparison, to determine associated half tone density differences for each printing ink;

forming a half tone density difference vector composed of the half tone density differences; and multiplying said half tone density difference vector by said inverted colorimetric half tone density transform matrix to obtain a color variation vector having as its components the colorimetric measure differences in a color space uniformly stepped relative to perception.

2. Process for the color control of ink regulation of the print of a printing machine, wherein measuring fields on production sheets printed by the printing machine are optically detected to determine a color deviation of each measuring field detected from a given set color position and to produce an adjusting value for setting the ink control elements of the printing machine, so that undesirable color variations in production sheets subsequently printed are minimized, comprising the steps of:

printing under nominal conditions, by means of a printing machine, a reference calibration print and several addition calibrating prints, said prints each comprising a plurality of full tone fields and a co-printed half tone field similar in color to desired half tone fields of the production sheets, with each of said addition calibration prints for at least one full tone field having a full tone density differing from that of a corresponding full tone field of similar color of the reference calibration print;

determining, by means of a densitometer, half tone density differences between half tone densities of the half tone field of the reference calibration print and half tone densities of the half tone fields of the addition calibration prints;

determining, by means of a spectrophotometer, colorimetric measure differences between colorimetric measures of the half tone field of the reference calibration print and colorimetric measures of the half tone fields of the addition calibration prints;

substituting values obtained for the half tone density differences and colorimetric measure differences into a matrix equation:

$$[\Delta R]_i = [W] \cdot [\Delta F]_i$$

to determine elements of a colorimetric measure-half tone density transform matrix [W], in which $[\Delta R]_i$ is a half tone difference vector correlated with an addition calibrating print indexed by a value i and having components formed from the half tone density differences for each printing ink, and $[\Delta F]_i$ is a colorimetric measure difference vector with components formed from the colorimetric measure differences;

inverting said colorimetric measure-half tone density transform matrix;

providing a measuring field on an OK sheet and on each production sheet as a half tone field composed of several printing inks;

scanning the half tone field of a production sheet and the OK sheet with a densitometer and determining a difference between associated half tone densities for each half-tone field printing ink involved;

forming a half tone density difference vector having the half tone density differences of said half-tone printing inks as components;

multiplying said half tone density difference vector by said inverted colorimetric measure-half tone density transform matrix, to obtain a color variation vector containing as its components the colorimetric measure differences in a color space uniformly stepped relative to perception;

producing a layer thickness variation control vector from the color variation vector for adjusting ink control elements of the printing machine.

3. Process according to claim 2, further comprising the steps of:

determining, from predetermined boundary densities and measured full tone densities of full tone fields printed together with the half tone field on each production sheet, a correction color space around an actual color position measured on the desired half tone field;

determining whether a given set color position is located outside said correction color space; and, replacing said position outside said correction color space with an attainable set color position on a boundary surface of the correction color space, using a color deviation from the given set color position having components essential for printing quality which are minimal.

4. Process according to claim 3, further comprising a step of calculating the color variation vector or a substitute color variation vector in accordance with a regulation strategy in the color space with consideration of boundary values for attainable full tone densities; and, multiplying the color variation vector or substitute color variation vector by a colorimetric measure-full tone density transform matrix, to obtain the layer thickness variation control vector.

5. Process according to claim 4, further comprising the steps of:

determining for each desired color, by means of the densitometer, a full tone density difference between the full tone densities of the full tone field of the reference calibration print and the full tone densities of the addition calibrating prints; determining, by means of the spectrophotometer, colorimetric measure differences between colorimetric measures of the half tone field of the reference calibration print and colorimetric measures of the half tone fields of the addition calibrating prints;

substituting the values obtained for the full tone density differences and colorimetric measure differences into a matrix equation:

$$[\Delta V]_i = [Z] \cdot [\Delta F]_i$$

to determine elements of the colorimetric measure-full tone density transform matrix [Z], in which $[\Delta V]_i$ is a full tone difference vector correlated with an addition calibrating print indexed by a value i and having components formed by the full tone density differences for each printing ink, and $[\Delta F]_i$ is a colorimetric measure difference vector with components formed from the colorimetric measure differences.

6. Process according to claim 4, comprising the steps of:

determining, by means of a densitometer, half tone density differences between the half tone field of the reference calibration print, and half tone fields of the addition calibrating prints;

determining for each desired color a full tone density difference between full tone densities of the full tone field of the reference calibration print, and full tone densities of the full tone fields of the addition calibrating prints;

substituting values obtained for the half tone density differences and full tone density differences into a matrix equation:

$$[\Delta R]_i = [X] \cdot [\Delta V]_i$$

to determine elements of a full tone density-half tone density transform matrix [X] in which $[\Delta R]_i$ is a half tone difference vector correlated with an addition calibrating print indexed by a value i and having components formed by the half tone density differences for each printing ink, and $[\Delta V]_i$ is a full tone density difference vector associated by the i addition calibrating print and having components formed by the full tone differences;

inverting said full-tone density-half tone density transform matrix [X]; and multiplying said colorimetric measure-half tone density transform matrix [W] by said inverted full tone density-half tone density transform matrix $[X]^{-1}$ to obtain a colorimetric measure-full tone density transform matrix.

7. Process according to claim 2, wherein said half tone measuring fields of said OK sheet and said production sheet, and said coprinted half tone fields of said reference calibration print and said calibration prints are gray balance fields.

* * * * *